United States Patent
Aist et al.

(10) Patent No.: US 9,581,458 B2
(45) Date of Patent: Feb. 28, 2017

(54) NAVIGATION SYSTEM WITH LANDMARK RECOGNITION MECHANISM AND METHOD OF OPERATION THEREOF

(71) Applicant: Telenav, Inc., Sunnyvale, CA (US)

(72) Inventors: Gregory Stewart Aist, San Mateo, CA (US); Jose Sebastian, Mountain View, CA (US); Aliasgar Mumtaz Husain, Milpitas, CA (US); Casey Carter, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 168 days.

(21) Appl. No.: 14/160,097

(22) Filed: Jan. 21, 2014

(65) Prior Publication Data
US 2015/0204686 A1 Jul. 23, 2015

(51) Int. Cl.
*G01C 21/36* (2006.01)

(52) U.S. Cl.
CPC ..... *G01C 21/3644* (2013.01); *G01C 21/3641* (2013.01)

(58) Field of Classification Search
CPC . G01C 21/26; G01C 21/3644; G01C 21/3697
USPC ........................................................ 701/400
See application file for complete search history.

(56) References Cited

U.S. PATENT DOCUMENTS

| | | | |
|---|---|---|---|
| 6,144,318 A * | 11/2000 | Hayashi | G01C 21/3658 701/438 |
| 6,728,635 B2 | 4/2004 | Hamada et al. | |
| 8,370,060 B2 | 2/2013 | Rossio et al. | |
| 8,374,791 B2 | 2/2013 | Holsinger | |
| 2002/0120397 A1* | 8/2002 | Kepler | G09B 29/006 701/426 |
| 2007/0078596 A1* | 4/2007 | Grace | G01C 21/3476 701/533 |
| 2011/0082668 A1 | 4/2011 | Escrig et al. | |
| 2011/0130956 A1* | 6/2011 | Tracton | G01C 21/3644 701/533 |

FOREIGN PATENT DOCUMENTS

WO 2010081549 A1 7/2010

OTHER PUBLICATIONS

Furchgott, Navigating With Devices That Know Landmarks, The New York Times, Feb. 15, 2013, The New York Times Company, http://www.nytimes.com/2013/02/17/automobiles/navigating-with-devices-that-know-landmarks.html?_r=3&.
Garmin Nuvi, http://sites.garmin.com/nuvi/.
Hile et al., Landmark-Based Pedestrian Navigation with Enhanced Spatial Reasoning, pp. 1-18.

* cited by examiner

*Primary Examiner* — John Q Nguyen
*Assistant Examiner* — Anshul Sood
(74) *Attorney, Agent, or Firm* — IP Investment Law Group

(57) ABSTRACT

A method of operation of a navigation system includes: determining a travel context with a control unit for traveling through a geographic region; generating a mental model for the travel context; and determining a guidance landmark based on the mental model for providing a navigation guidance for presenting on a device.

20 Claims, 6 Drawing Sheets

NAVIGATION SYSTEM WITH LANDMARK RECOGNITION MECHANISM AND METHOD OF OPERATION THEREOF

CROSS-REFERENCE TO RELATED APPLICATION(S)

The present application contains subject matter related to a concurrently filed U.S. Patent Application by Gregory Stewart Aist, Jose Sebastian, Aliasgar Mumtaz Husain, and Casey Carter entitled "NAVIGATION SYSTEM WITH ROUTE GUIDANCE MECHANISM AND METHOD OF OPERATION THEREOF." The related application is assigned to Telenav, Inc. and is identified by application Ser. No. 14/160,002. The subject matter thereof is incorporated herein by reference thereto.

The present application contains subject matter related to a concurrently filed U.S. Patent Application by Gregory Stewart Aist, Jose Sebastian, Aliasgar Mumtaz Husain, and Casey Carter entitled "NAVIGATION SYSTEM WITH DATA GATHERING MECHANISM AND METHOD OF OPERATION THEREOF." The related application is assigned to Telenav, Inc. and is identified by application Ser. No. 14/160,186. The subject matter thereof is incorporated herein by reference thereto.

TECHNICAL FIELD

The present invention relates generally to a navigation system, and more particularly to a system with landmark recognition mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving landmark recognition mechanism to adjust reference point has become a paramount concern for the consumer. The inability decreases the benefit of using the tool.

Thus, a need still remains for a navigation system with landmark recognition mechanism to adjust the current location of a device. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a travel context with a control unit for traveling through a geographic region; generating a mental model for the travel context; and determining a guidance landmark based on the mental model for providing a navigation guidance for presenting on a device.

The present invention provides a navigation system including: a control unit for: a control unit for: determining a travel context with a control unit for traveling through a geographic region, generating a mental model for the travel context, determining a guidance landmark based on the mental model for providing a navigation guidance, and a communication interface, coupled to the control unit, for communicating the navigation guidance with the guidance landmark for presenting on a device.

The present invention provides a navigation system with a non-transitory computer readable medium including instructions for execution by a control unit comprising: determining a travel context for traveling through a geographic region; generating a mental model for the travel context; and determining a guidance landmark based on the mental model for providing a navigation guidance for presenting on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
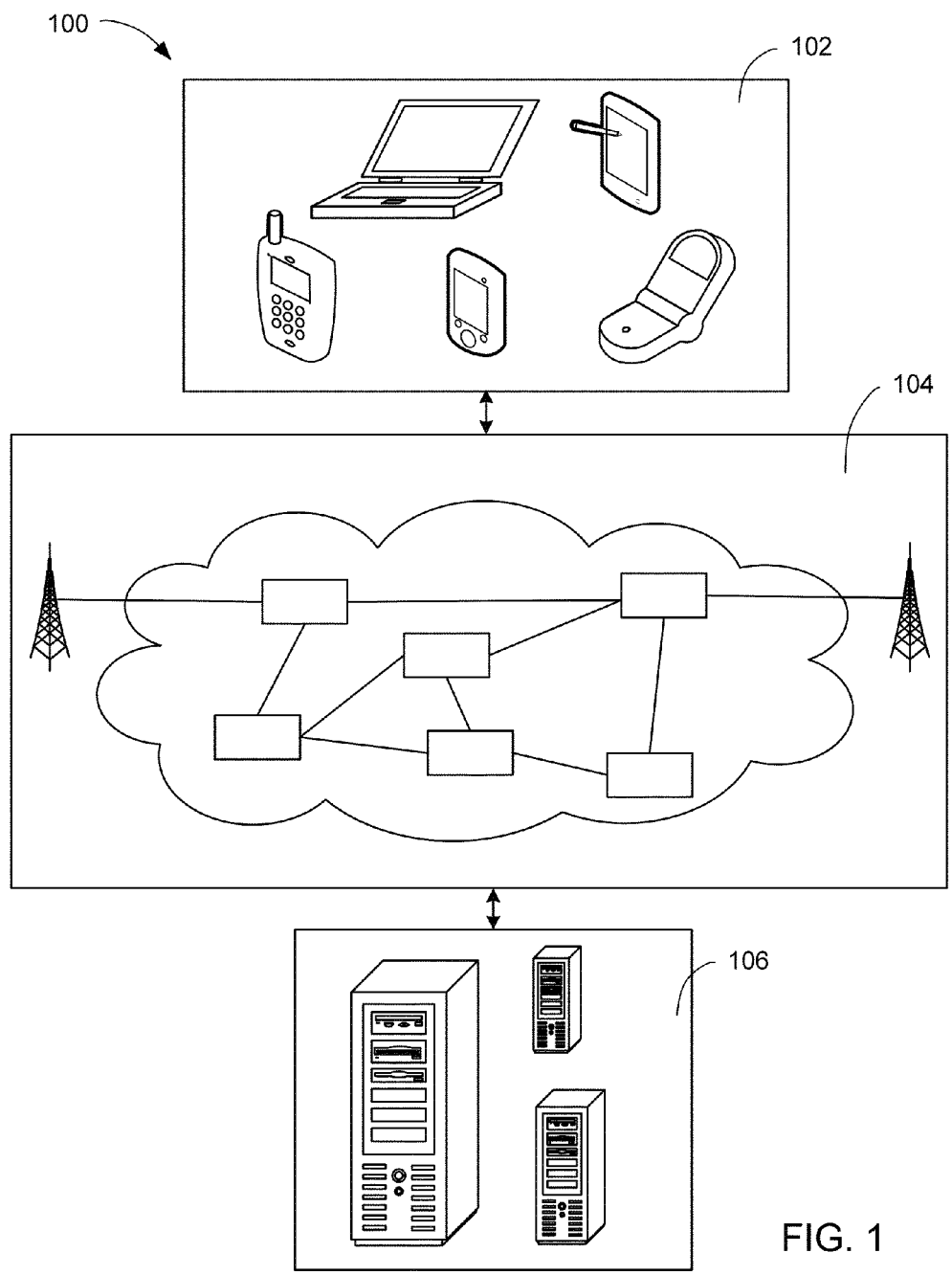
FIG. 1 is a navigation system with landmark recognition mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof Referring now to FIG. 1, therein is shown a navigation system 100 with landmark recognition mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10 ™ Business Class mainframe or a HP ProLiant ML ™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone ™, Android ™ smartphone, or Windows ™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof Referring now to FIG. 2, there is shown an example of a geographic region 202 traveled by the user of the navigation system 100. For clarity and brevity, the discussion of the embodiment of the present invention will focus on the first device 102 delivering the result generated by the navigation system 100. However, the second device 106 of FIG. 1 and the first device 102 can be discussed interchangeably.

The geographic region 202 can represent a metropolitan area, a rural area, or a combination thereof. The geographic region 202 can also represent a neighborhood, a city, a county, a state, a country, or a combination thereof. A geographic location 204 is defined as a place or a position in the geographic region 202. For example, the geographic location 204 can represent a building, a street intersection, a national park, or a combination thereof. The first device 102 can display the geographic region 202, the geographic location 204, or a combination thereof.

A maneuver location 206 is defined as a position of the first device 102. A target destination 208 is defined as the geographic location 204 where the travel ends. For example, the target destination 208 can represent a waypoint, endpoint, or a combination thereof. A start location 210 is defined as the geographic location 204 where the travel starts. For example, the start location 210 can represent a waypoint, start point, the maneuver location 206, or a combination thereof. A travel route 212 is defined as a path from the start location 210 to the target destination 208.

A travel context 214 is defined as a situation, circumstance, or a combination thereof surrounding the first device 102. For example, the travel context 214 can be determined based on a travel condition 216. The travel condition 216 can include a travel time 218, a travel history 220, a road type 222, a user vicinity 224, or a combination thereof The travel time 218 is defined as a time frame. For example, the travel time 218 can represent a time of day, week, month, year, or a combination thereof. For another example, the travel time 218 can represent a time span of day, week, month, year, or a combination thereof. The travel history 220 is defined a log of the user's travel. For example, the travel history 220 can indicate a frequency of how many times the user had traveled within the geographic region 202, had traveled to the geographic location 204, or a combination thereof logged by the first device 102 having the navigation system 100. For further example, the travel history 220 can also include traveling nearby or past the geographic region 202, the geographic location 204, or a combination thereof. For example, the user can live in the geographic region 202 representing Manhattan, N.Y. And the user can never have traveled to the geographic region 202 representing Staten Island of New York. But because Manhattan and Staten Island are close by, the user can be familiar with the geographic region 202 of Staten Island. For another example, the user may have never visited the geographic location 204 representing the Empire State Building in Manhattan. But because the user lives in the geographic region of 202 representing Manhattan, the user can still be familiar with the geographic location 204. A travel threshold 226 is defined as the minimum number visits to the geographic location 204, the target destination 208, or a combination thereof. For example, the travel threshold 226 can represent a number of visits greater than zero times.

The road type 222 is a classification of a road. For example, the road type 222 can include local road, arterial road, express way, high occupancy vehicle lane, freeway, or a combination thereof. The user vicinity 224 is a distance from the maneuver location 206 to the geographic location 204 perceptible. For example, the user vicinity 224 can represent the distance from the maneuver location 206 where the user of the navigation system 100 can see the geographic location 204. For another example, the user vicinity 224 can represent the radius from the maneuver location 206 where a capturing sensor 228 can detect an object 230, the geographic location 204, or a combination thereof.

The capturing sensor 228 is defined as a device that captures the travel condition 216 surrounding the first device 102. The object 230 can include a person, a vehicle, a road fixture, a building, or a combination thereof.

A navigation guidance 232 is defined as information provided by the navigation system 100 to aid the user' travel. The navigation guidance 232 can include a guidance landmark 234.

The guidance landmark 234 is defined as a conspicuous reference to aid the user's travel. For example, the guidance landmark 234 can be the geographic location 204 representing the Empire State Building in New York City.

The guidance landmark 234 can include a stationary landmark 236, a dynamic landmark 238, or a combination thereof. The stationary landmark 236 is defined as a conspicuous reference that does not change. The dynamic landmark 238 is defined as a conspicuous reference that can continuously change. For example, the navigation system 100 can determine the object 230 representing a building as the stationary landmark 236. In contrast, the navigation system 100 can determine the object 230 representing a moving vehicle, an electric billboard, a policeman directing traffic, or a combination thereof as the dynamic landmark 238.

The navigation system 100 can identify the guidance landmark 234 within a landmark-determination zone 240. The landmark-determination zone 240 is defined as an area designated to identify the object 230 as the guidance landmark 234. For example, the landmark-determination zone 240 can represent a metropolitan area, a rural area, or a combination thereof For another example, the landmark-determination zone 240 can also represent a neighborhood, a city, a county, a state, a country, or a combination thereof. For further example, the landmark-determination zone 240 can represent a subarea within the geographic region 202.

Figure 3:
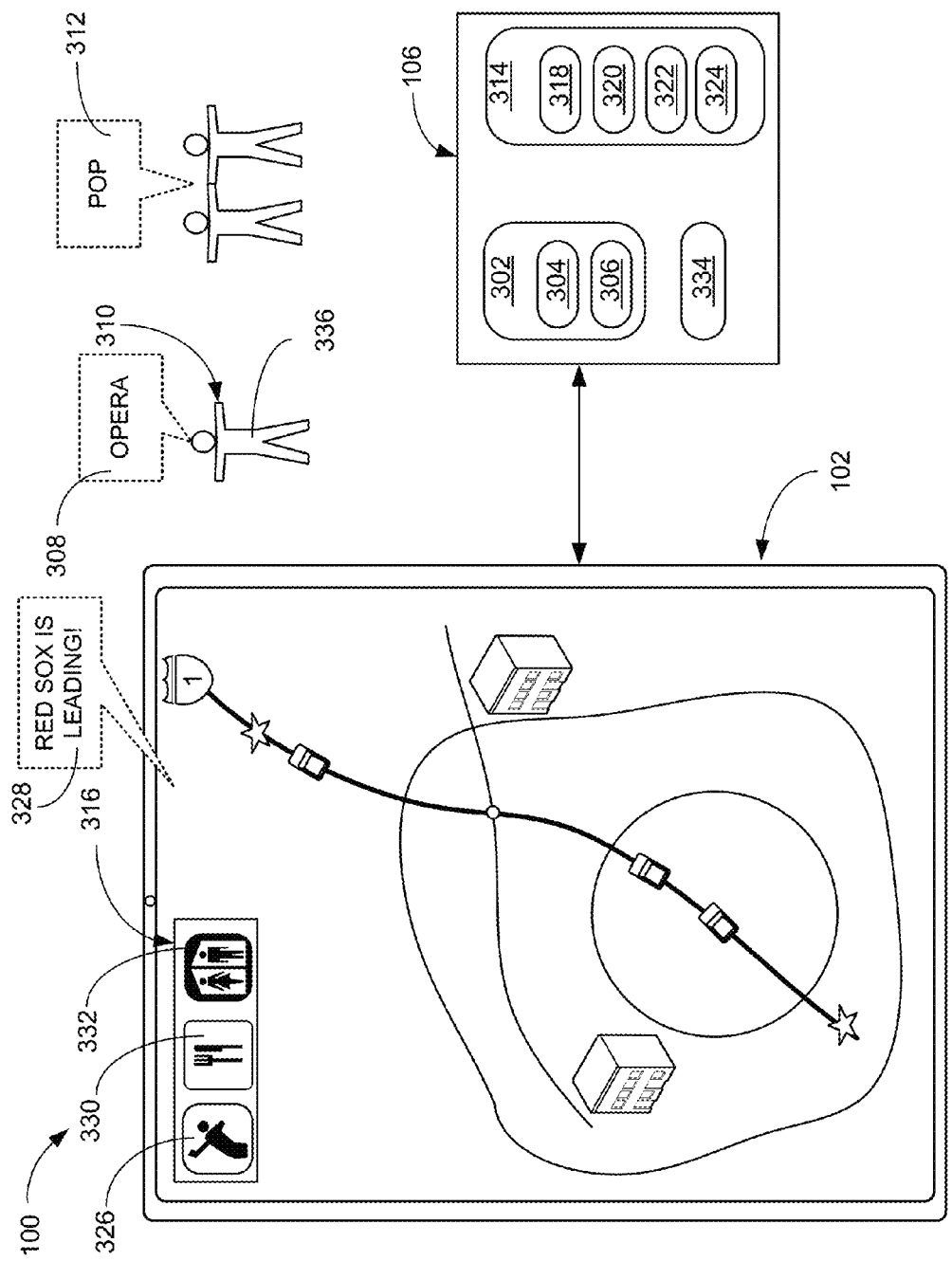
FIG. 3 is an example of a mental model factored by the navigation system.

Referring now to FIG. 3, there is shown an example of a mental model 302 factored by the navigation system 100. The mental model 302 is defined as a representation of a mind. FIG. 3 can illustrate the communication between the first device 102 and the second device 106 through the communication path 104 for building the mental model 302. For example, the mental model 302 can represent a digital representation of what a user 336 of the navigation system 100 knows, thinks, senses, or a combination thereof. For another example, the mental model 302 can represent a digital representation of what the society knows, thinks, senses, or a combination thereof. More specifically, the mental model 302 can include a user knowledge model 304, a common knowledge model 306, or a combination thereof.

The user knowledge model 304 is defined as a representation of a user's mind. For example, the user knowledge model 304 can represent a user's knowledge 308, a user's sensibility 310, or a combination thereof. For example, the user's knowledge 308 can represent the user's awareness, the user's expertise, the user's intelligence, the user's familiarity, or a combination thereof. For another example, the user's sensibility 310 can represent the user's capacity for sensation, the user's mental susceptibility or responsiveness, the user's attention span, or a combination thereof.

The common knowledge model 306 is defined as a representation of a knowledge held by people in general. For example, the common knowledge model 306 can represent a common knowledge 312 for the geographic region 202 of FIG. 2. For example, the common knowledge 312 can represent information generally known to everyone, such as, the sun will rise from the East.

The navigation system 100 can build the mental model 302 based on a user profile 314, an analytic reference 316, or a combination thereof. The user profile 314 is defined as user's personal information. For example, the user profile 314 can include a user's profession 318, a user's interest 320, a user activity 322, a user's capability 324, or a combination thereof. The user's profession 318 can represent the user's occupation. The user's interest 320 can represent user's predilection. The user activity 322 can represent a log of actions taken by the user. For example, the user activity 322 can represent the user's usage information of the first device 102, the navigation system 100, or a combination thereof. The user's capability 324 can represent the user's biological faculty. For example, the user's capability 324 can represent that the user is colorblind, thus, cannot distinguish the color green from other colors. For another example, the user's capability 324 can represent that user has mastery of foreign language other than English, such as Hindi, Spanish, Mandarin, or a combination thereof.

The analytic reference 316 is defined as information referenced by the navigation system 100 to build the mental model 302. For example, the analytic reference 316 can include an image reference 326, a real-time reference 328, a locality reference 330, a cultural reference 332, or a combination thereof. The image reference 326 can represent a photograph, a drawing, a video, or a combination thereof. The real-time reference 328 can represent live-stream data, such as audio broadcast, video broadcast, text stream, or a combination thereof. The locality reference 330 can represent information specific to the geographic region 202. The cultural reference 332 can represent social knowledge, behavior, tradition, or a combination thereof.

Figure 2:
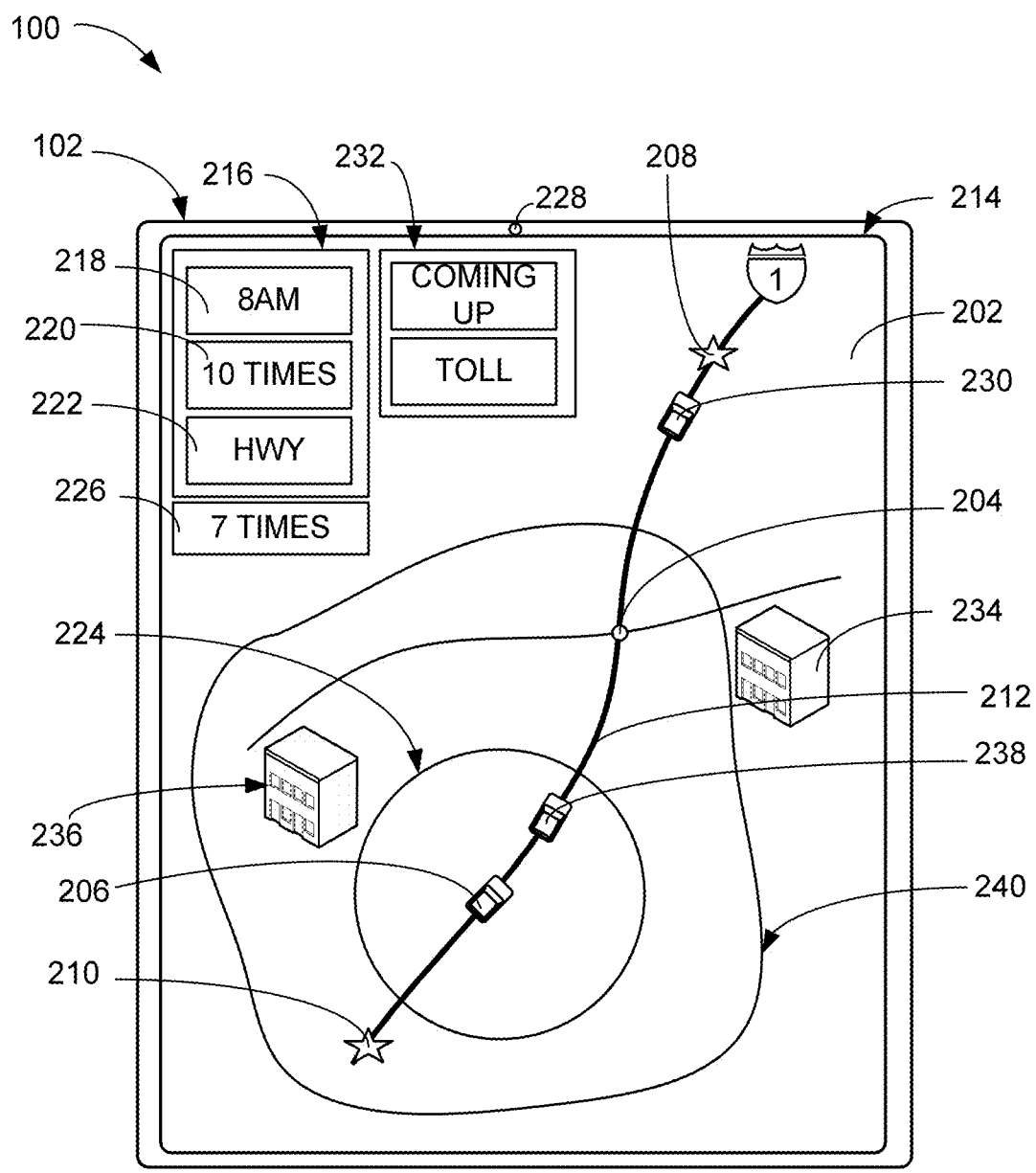
FIG. 2 is an example of a geographic region traveled by the user of the navigation system.

A category of interest 334 is defined as a classification of the object 230 of FIG. 2, the geographic location 204 of FIG. 2, the geographic region 202 of FIG. 2, or a combination thereof. For example, if the geographic location 204 serves Chinese food, the category of interest 334 can represent a restaurant.

Figure 4:
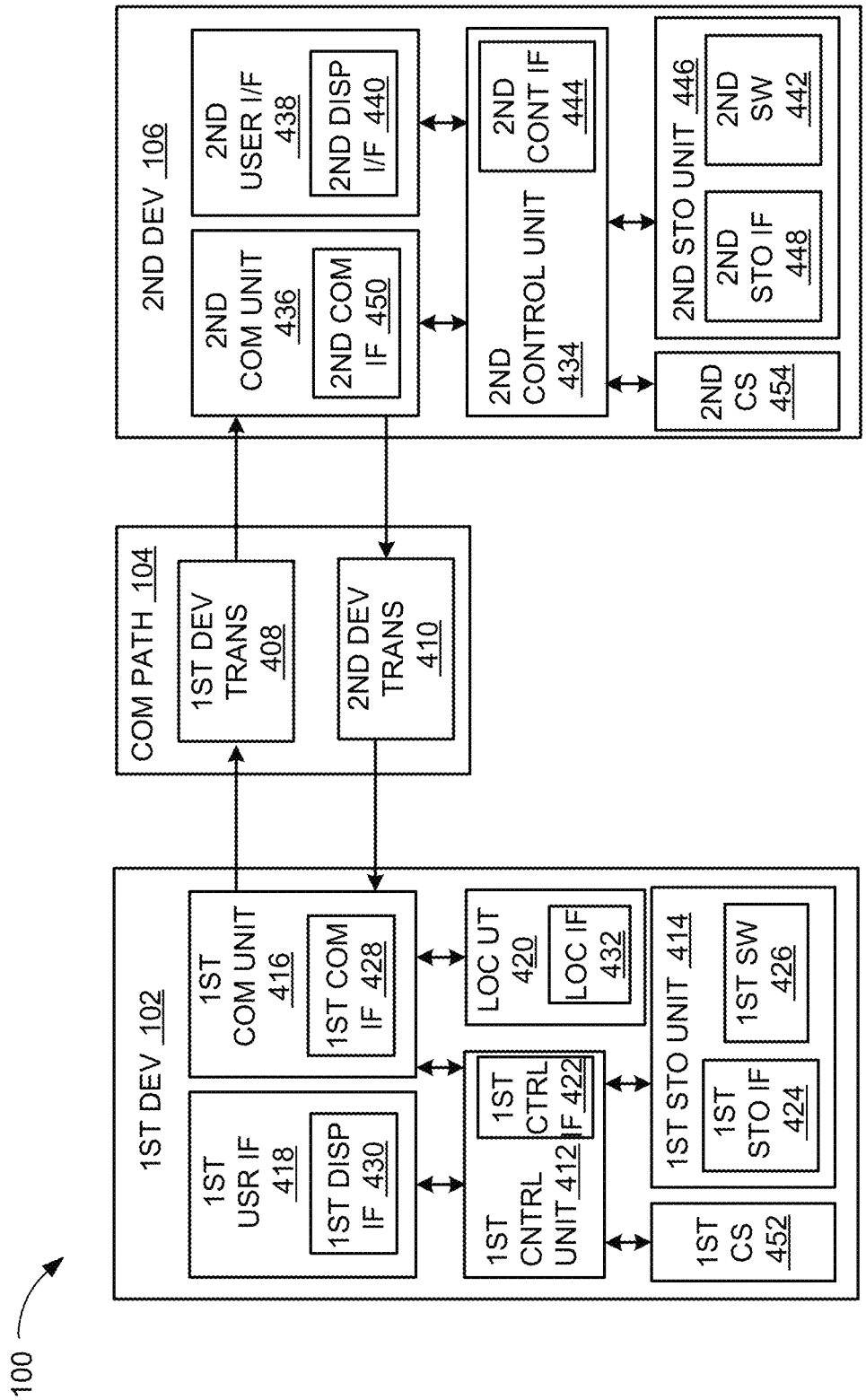
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof.

The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

A first capturing sensor 452 can represent the capturing senor 228 of FIG. 2. The first capturing sensor 452 can capture the inanimate object location 230 of FIG. 2 in the traversal context 218 of FIG. 2. The first capturing sensor 452 can capture the inanimate object location 230 from the outside, the inside, or the combination thereof of the user's vehicle.

Examples of the first capturing sensor 452 can include a digital camera, video camera, thermal camera, night vision camera, infrared camera, x-ray camera, or the combination thereof. Examples of the first capturing sensor 452 can include accelerometer, thermometer, microphone, wireless signal receiver, remote physiological monitoring device, light identifier, or the combination thereof.

A second capturing sensor 454 can represent the capturing senor 228. The second capturing sensor 454 can capture the inanimate object location 230 in the traversal context 218. The second capturing sensor 454 can capture the inanimate object location 230 from the outside, the inside, or the combination thereof of the user's vehicle.

Examples of the second capturing sensor 354 can include a digital camera, video camera, thermal camera, night vision camera, infrared camera, x-ray camera, or the combination thereof. Examples of the second capturing sensor 354 can include accelerometer, thermometer, microphone, wireless signal receiver, remote physiological monitoring device, light identifier, or the combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
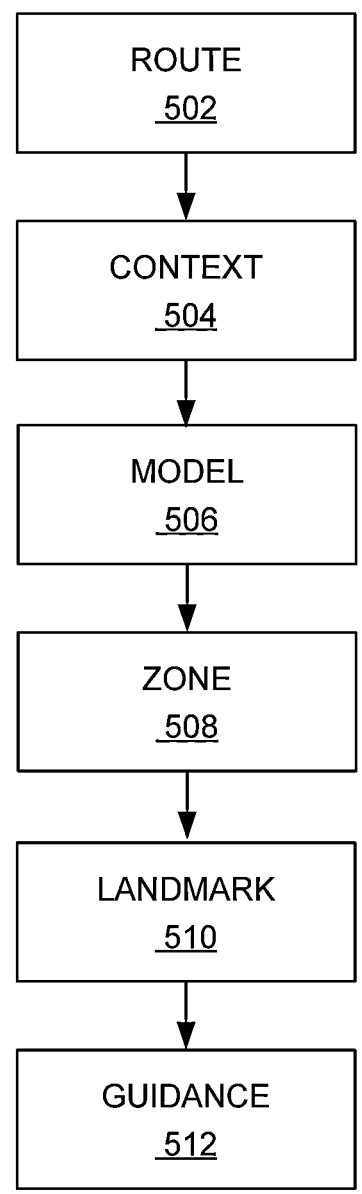
FIG. 5 is a control flow of the navigation system.

Referring now to FIG. 5, therein is shown a control flow of the navigation system 100. The navigation system 100 can include a route module 502. The route module 502 generates the travel route 212 of FIG. 2. For example, the route module 502 can generate the travel route 212 from the start location 210 of FIG. 2 to the target destination 208 of FIG. 2. For another example, the route module 502 can generate the travel route 212 from the maneuver location 206 of FIG. 2 to the target destination 208. The route module 502 can communicate the travel route 212 to a context module 504.

The navigation system 100 can include the context module 504, which can couple to the route module 502. The context module 504 determines the travel context 214 of FIG. 2. For example, the context module 504 can determine the travel context 214 based on the travel condition 216 of FIG. 2.

The context module 504 can determine the travel context 214 in a number of ways. For example, the context module 504 can determine the travel context 214 based on the travel condition 216 surrounding the user of the navigation system 100 operating the first device 102. More specifically, the travel condition 216 can include the target destination 208, the start location 210, the maneuver location 206, the geographic region 202 of FIG. 2, the travel time 218 of FIG. 2, or a combination thereof. Further, the travel condition 216 can also include the road type 222 of FIG. 2, the travel history 220 of FIG. 2, the geographic location 204 of FIG. 2, or a combination thereof.

For a specific example, the context module 504 can determine the travel context 214 representing that the user is traveling at night based on the travel time 218 representing 9 PM. For another example, the context module 504 can determine the travel context 214 representing that the user is traveling at high speed based on the maneuver location 206 located on the road type 222 representing a freeway based on the location unit 420 of FIG. 4 determining the current location of the first device 102. For further example, the context module 504 can determine the travel context 214 that the user is familiar with the geographic region 202 based on the travel history 220 meeting or exceeding the travel threshold 226 of FIG. 2. The context module 504 can communicate the travel context 214 to a model module 506.

The navigation system 100 can include the model module 506, which can couple to the context module 504. The model module 506 generates the mental model 302 of FIG. 3. For example, the model module 506 can generate the mental model 302 based on the user profile 314 of FIG. 3, the analytic reference 316 of FIG. 3, the travel context 214, the travel condition 216, or a combination thereof.

The model module 506 can generate the mental model 302 in a number of ways. For example, the model module 506 can generate the mental model 302 based on the user profile 314. More specifically, the model module 506 can generate the mental model 302 for the travel context 214, the travel condition 216, or a combination thereof.

For a specific example, the model module 506 can generate the mental model 302 representing the user knowledge model 304 of FIG. 3. More specifically, the model module 506 can generate the user knowledge model 304 based on the user profile 314. For example, the user profile 314 can include the user's profession 318 of FIG. 3 as opera singer and the user's interest 320 of FIG. 3 as classical music. Furthermore, the user profile 314 can include the travel history 220 of the user performing at various concert halls and opera houses in various instances of the geographic location 204. The model module 506 can generate the user knowledge model 304 by building a data structure that establishes a relationship amongst the user's profession 318, the user's interest 320, the travel history 220, or a combination thereof to represent the user's knowledge 308 of FIG. 3 of subject and object related to classical music and recital location.

For another example, the model module 506 can generate the user knowledge model 304 based on the user profile 314 representing the user activity 322 of FIG. 3, the user's capability 324 of FIG. 3, or a combination thereof. More specifically, the user's capability 324 can indicate that the user is colorblind. Furthermore, the user activity 322 can indicate that the user did not select content on the web that is colored in green. The model module 506 can generate the user knowledge model 304 by building a data structure that establishes a relationship between the user activity 322, the user's capability 324, or a combination thereof to represent the user's sensibility 310 of FIG. 3.

For a different example, the model module 506 can generate the user knowledge model 304 based on the analytic reference 316. The analytic reference 316 can represent the image reference 326 of FIG. 3 posted on the user's social network site. More specifically, the image reference 326 can represent the digital photos of the user's friend visiting the geographic region 202 of Athens, Greece. The digital photos were shared by the user's friend to the user and were tagged as photos from Athens, Greece in the social network site. The user activity 322 can indicate that the user commented on the photos of the Parthenon in Athens on the social network site, thus, the photos were seen by the user. The model module 506 can communicate with the social network site via the first control interface 422 of FIG. 4 for tracking the user activity 322 performed on the first device 102 to access the social network site. The model module 506 can generate the user knowledge model 304 indicating the user's knowledge 308 regarding Parthenon based on the image reference 326 accessed by the user.

For a different example, the model module 506 can generate the user knowledge model 304 based on the user profile 314, the analytic reference 316 representing the real-time reference 328 of FIG. 3, or a combination thereof. The user profile 314 can include the user's interest 320 of the user being a fan of Boston Red Sox ™, an American baseball team. The real-time reference 328 can represent the live radio broadcast of the Red Sox ™ baseball game. The travel context 214 can represent that the user is listening to the radio while operating the vehicle. The model module 506 can generate the user knowledge model 304 representing that the user's sensibility 310 is focused on the game during the travel context 214.

For another example, the model module 506 can generate the mental model 302 representing the common knowledge model 306 of FIG. 3. More specifically, the model module 506 can generate the common knowledge model 306 based on the analytic reference 316 for the geographic region 202. For example, the geographic region 202 can represent Boston, Massachusetts. The analytic reference 316 can represent the locality reference 330 of FIG. 3 indicating that the Bostonians hate the New York Yankees ™, an American baseball team. The model module 506 can generate the common knowledge model 306 representing the common knowledge 312 of FIG. 3 for the geographic region 202 based on the locality reference 330 prevalent for the geographic region 202.

For another example, the model module 506 can generate the common knowledge model 306 based on the analytic reference 316 representing the cultural reference 332 of FIG. 3 for the category of interest 334 of FIG. 3. The category of interest 334 can represent soft drink. The geographic region 202 can represent the Midwest of the United States. The cultural reference 332 for soft drink in the Midwest can represent "pop" instead of "soda" or "coke" from other regions of the geographic region 202. The model module 506 can generate the common knowledge model 306 representing the cultural reference 332 for the category of interest 334 for the geographic region 202. The model module 506 can communicate the mental model 302 to a zone module 508.

The navigation system 100 can include the zone module 508, which can couple to the model module 506. The zone module 508 determines the landmark-determination zone 240 of FIG. 2. For example, the zone module 508 can determine the landmark-determination zone 240 based on the travel context 214, the travel condition 216, the mental model 302, or a combination thereof.

The zone module 508 can determine the landmark-determination zone 240 in a number of ways. For example, the travel context 214 can represent user is traveling to the target destination 208 never visited by the user before. The mental model 302 can represent the user knowledge model 304 of user having the user's knowledge 308 of art deco architecture. The zone module 508 can determine the landmark-determination zone 240 based on the geographic region 202 having the geographic location 204 with the art deco architecture. For further example, the zone module 508 can filter the geographic region 202 not suitable as the landmark-determination zone 240 based on the geographic region 202 not having the art deco architecture.

It has been discovered that the navigation system 100 determining the landmark-determination zone 240 based on the user knowledge model 304 can improve the efficiency of determining the guidance landmark 234 of FIG. 2 suited for the user. The determination of the landmark-determination 240 can filter the geographic region 202 not suited, thus, allocating more resources for the navigation system 100 to determine the guidance landmark 234. As a result, the navigation system 100 can improve the efficiency for determining the guidance landmark 234 suited for the user for safer operation of the vehicle, the navigation system 100, or a combination thereof.

For another example, the user knowledge model 304 can indicate that user is colorblind as discussed above. The travel context 214 can represent that user is driving in a forest with heavy greenery. The zone module 508 can determine the landmark-determination zone 240 to be outside of the geographic region 202 of forest. In contrast, for further example, the zone module 508 can determine the landmark-determination zone 240 to represent the geographic region 202 where the maneuver location 206 is detected by the location unit 420.

For a different example, the zone module 508 can determine the landmark-determination zone 240 based on the common knowledge model 306 for the geographic region 202. The common knowledge model 306 can represent that the geographic region 202 can include the geographic location 204 representing a pumpkin patch for the travel context 214 of October. The zone module 508 can determine the geographic region 202 with the pumpkin patch as the landmark-determination zone 240.

For a different example, the zone module 508 can determine the landmark-determination zone 240 based on the user vicinity 224 of FIG. 2. More specifically, the user vicinity 224 can represent 30 meter radius from the maneuver location 206. The zone module 508 can determine the landmark-determination zone 240 representing the user vicinity 224 from the maneuver location 206. The zone module 508 can communicate the landmark-determination zone 240 to a landmark module 510.

The navigation system 100 can include the landmark module 510, which can couple to the zone module 508. The landmark module 510 determines the guidance landmark 234. For example, the landmark module 510 can determine the guidance landmark 234 based on the mental model 302, the landmark-determination zone 240, the travel context 214, the travel condition 216, or a combination thereof. For further example, the landmark module 510 can determine the guidance landmark 234 based on the user knowledge model 304, the common knowledge model 306, or a combination thereof.

The landmark module 510 can determine the guidance landmark 234 in a number of ways. For example, the landmark module 510 can determine the guidance landmark 234 representing the stationary landmark 236 of FIG. 2. More specifically, the landmark-determination zone 240 can represent the city of Vienna, Austria. Continuing from the previous example, the user knowledge model 304 can represent the user's knowledge 308 regarding classical music and opera. The landmark module 510 can determine the stationary landmark 236 representing the geographic location 204 representing the Vienna State Opera as the guidance landmark 234.

For another example, the landmark module 510 can determine the guidance landmark 234 representing the dynamic landmark 238 of FIG. 2. More specifically, the landmark-determination zone 240 can represent the user vicinity 224 of 40 meter radius from the maneuver location 206. The user knowledge model 304 can represent the user's sensibility 310 towards red vehicles since the user also owns a red vehicle.

The landmark module 510 can capture the object 230 of FIG. 2 representing the red vehicle with the first capturing sensor 452 of FIG. 4. Furthermore, the landmark module 510 can determine that the object 230 captured is a red vehicle based on using the image recognition algorithm. Some examples of the image recognition algorithm can include a contour and shape based object recognition method, an appearance-based object recognition method, and anchor point detection algorithm. Furthermore, the landmark module 510 can track the object 230 is in motion, thus dynamic, with the first capturing sensor 452. As a result, the landmark module 510 can determine a red vehicle operating within the landmark-determination zone 240 as the dynamic landmark 238.

For further example, the landmark module 510 can determine the stationary landmark 236, dynamic landmark 238, or a combination thereof tailored to the user's knowledge 308, the user's sensibility 310, the user's capability 324, or a combination thereof. More specifically, the landmark module 510 can determine the guidance landmark 234 by excluding the geographic location 204, the object 230, or a combination thereof unsuitable to the user's knowledge 308, the user's sensibility 310, the user's capability 324, or a combination thereof For example, the user knowledge model 304 can represent the user's capability 324 of the user being colorblind, thus, the user's sensibility 310 towards certain color can be not as acute. As a result, the landmark module 510 can determine the stationary landmark 236, dynamic landmark 238, or a combination thereof excluding the geographic location 204, the object 230, or a combination thereof with certain color, such as green, red, blue, yellow, or a combination thereof.

For another example, the user's knowledge model 304 can represent the user's capability 324 of being able to speak English, thus, the user's sensibility 310 towards foreign languages can be not acute. As a result, the landmark module 510 can determine the stationary landmark 236, dynamic landmark 238, or a combination thereof excluding the geographic location 204, the object 230, or a combination thereof having foreign language written. More specifically, the landmark module 510 can determine the guidance landmark 234 based on excluding the geographic location 204, the object 230, or a combination thereof unsuitable to the user knowledge model 304.

For another example, the landmark module 510 can determine the guidance landmark 234 suitable for the travel context 214 based on identifying the geographic location 204, the object 230, or a combination thereof within the landmark-determination zone 240. In contrast, if the geographic location 204, the object 230, or a combination thereof is outside of the landmark-determination zone 240, the landmark module 510 can determine the guidance landmark 234 unsuitable for the travel context 214.

It has been discovered that the navigation system 100 determining the guidance landmark 234 based on the user's knowledge 308, the user's sensibility 310, the user's capability 324, or a combination thereof can improve the safety of the user operating the vehicle, the navigation system 100, or a combination thereof. By factoring the user's knowledge 308, the user's sensibility 310, the user's capability 324, or a combination thereof, the navigation system 100 can provide the guidance landmark 234 most recognizable by the user. As a result, the user can safely comprehend the navigation guidance 232 of FIG. 2 to improve the safety of operating the vehicle, the navigation system 100, or a combination thereof.

For further example, the travel context 214 can represent that the user is listening to the World Series game for baseball on the radio. As determined previously, the user knowledge model 304 can indicate that the user's sensibility 310 towards operating the vehicle may be diminished due to his attention to the baseball broadcast. The landmark module 510 can determine the guidance landmark 234 to represent the stationary landmark 236 instead of the dynamic landmark 238 to provide time for the user to see the guidance landmark 234. More specifically, the landmark module 510 can select the geographic location 204 as the guidance landmark 234 over the object 230, such as a vehicle in motion, to provide ample time for the user to identify the guidance landmark 234. The landmark module 510 can communicate the guidance landmark 234 to a guidance module 512.

The navigation system 100 can include the guidance module 512, which can couple to the landmark module 510. The guidance module 512 generates the navigation guidance 232. For example, the guidance module 512 can generate the navigation guidance 232 based on the guidance landmark 234, the travel context 214, the travel condition 216, the mental model 302, or a combination thereof.

The guidance module 512 can generate the navigation guidance 232 in a number of ways. For example, the guidance module 512 can generate the navigation guidance 232 having the guidance landmark 234 represented as the stationary landmark 236, the dynamic landmark 238, or a combination thereof based on the mental model 302, the travel condition 216, the travel context 214, or a combination thereof. For a specific example, as discussed above, the travel context 214 can represent the user listening to the World Series broadcast while operating the vehicle. The user knowledge model 304 can indicate that the user's sensibility 310 for operating the vehicle is diminished by the game. The guidance module 512 can generate the navigation guidance 232 having the stationary landmark 236 instead of the dynamic landmark 238 to provide ample time for the user to recognize the guidance landmark 234.

For further example, the travel context 214 can be raining, thus, the visibility is low. The guidance module 512 can generate the navigation guidance 232 having the guidance landmark 234 represented as the dynamic landmark 238 of a Bentley ™ that is in hot pink color. Although the user profile 314 can indicate that the user despises the color, because the color is highly visible under the travel context 214, the guidance module 512 can include the Bentley ™ as the dynamic landmark 238.

For another example, the travel context 214 can represent the user touring in Bordeaux, France for visiting wineries. The travel history 220 can indicate that the user has never visited Bordeaux. However, since the user is a French wine enthusiast, the user knowledge model 304 can indicate that the user's knowledge 308 is extensive in regards to French wine brands. As a result, the guidance module 512 can generate the navigation guidance 232 having the guidance landmark 234 representing French wine brands to provide the navigation guidance 232 recognizable for the user.

For another example, the guidance module 512 can generate the navigation guidance 232 based on the user knowledge model 304 overriding the common knowledge model 306. For example, the travel context 214, the user can be traveling in the Midwest. The common knowledge model 306 for the geographic region 202 of Midwest for soft drink as discussed above can represent "pop." However, the user can be from Atlanta, Georgia, where the user knowledge model 304 for soft drink can represent "coke." Even if the user is traveling in the Midwest, the navigation guidance module 512 can generate the navigation guidance 232 having the guidance landmark 234 based on the user knowledge model 304 to tailor the navigation guidance 232 to the user's knowledge 308, the user's sensibility 310, or a combination thereof.

The physical transformation from traveling from one instance of the travel context 214 to another instance of the travel context 214 results in the movement in the physical world, such as people using the first device 102, the vehicle, or a combination thereof, based on the operation of the navigation system 100. As the movement in the physical world occurs, the movement itself creates additional information that is converted back into determining the guidance landmark 234, generating the navigation guidance 232, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the route module 502, the context module 504, the model module 506, the landmark module 510, and the guidance module 512.

The first control unit 412 of FIG. 4 can execute the first software 426 for the route module 502 to generate the travel route 212. The first control unit 412 can execute the first software 426 for the context module 504 to determine the travel context 214. The first control unit 412 can execute the first software 426 for the model module 506 to generate the mental model 302. The first control unit 412 can execute the first software 426 for the landmark module 510 to determine the guidance landmark 234. The first control unit 412 can execute the first software 426 for the guidance module 512 to generate the navigation guidance 232.

The second software 442 of FIG. 4 of the second device 106 of FIG. 4 can include the modules for the navigation system 100. For example, the second software 442 can include the route module 502, the context module 504, the model module 506, the landmark module 510, and the guidance module 512.

The second control unit 434 of FIG. 4 can execute the second software 442 for the route module 502 to generate the travel route 212. The second control unit 434 can execute the second software 442 for the context module 504 to determine the travel context 214. The second control unit 434 can execute the second software 442 for the model module 506 to generate the mental model 302. The second control unit 434 can execute the second software 442 for the landmark module 510 to determine the guidance landmark 234. The second control unit 434 can execute the second software 442 for the guidance module 512 to generate the navigation guidance 232.

The modules of the navigation system 100 can be partitioned between the first software 426 and the second software 442. The second software 442 can include the route module 502, the context module 504, and the model module 506. The second control unit 434 can execute modules partitioned on the second software 442 as previously described.

The first software 426 can include the landmark module 510 and the guidance module 512. Based on the size of the first storage unit 414 of FIG. 4, the first software 426 can include additional modules of the navigation system 100. The first control unit 412 can execute the modules partitioned on the first software 426 as previously described.

The first control unit 412 can operate the first communication interface 428 of FIG. 4 to communicate the maneuver location 206, the guidance landmark 234, the navigation guidance 232, or a combination thereof to or from the second device 106. The first control unit 412 can operate the first software 426 to operate the location unit 420 of FIG. 4. The second control unit 434 can operate the second communication interface 450 of FIG. 4 to communicate the maneuver location 206, the guidance landmark 234, the navigation guidance 232, or a combination thereof to or from the first device 102 through the communication path 104 of FIG. 4.

The first control unit 412 can operate the first user interface 418 of FIG. 4 to present the navigation guidance 232 having the guidance landmark 234. The second control unit 434 can operate the second user interface 438 of FIG. 4 to present the navigation guidance 232 having the guidance landmark 234.

The navigation system 100 describes the module functions or order as an example. The modules can be partitioned differently. For example, the landmark module 510 and the guidance module 512 can be combined. Each of the modules can operate individually and independently of the other modules. Furthermore, data generated in one module can be used by another module without being directly coupled to each other. For example, the landmark module 510 can receive the travel context 214 from the context module 504. Further, one module communicating to another module can represent one module sending, receiving, or a combination thereof the data generated to or from another module.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules. More specifically, the first control unit 412 or the second control unit 434 can be implemented as software, hardware, or a combination thereof.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

It has been discovered that the navigation system 100 determining the guidance landmark 234 based on the mental model 302 can improve the safety of the user operating the vehicle, the navigation system 100, or a combination thereof. The navigation system 100 can generate the mental model 302 based on the user profile 314 to represent the user's knowledge 308, the user's sensibility 310, or a combination thereof. Subsequently, based on the mental model 302, the navigation system 100 can provide the navigation guidance 232 suited for the travel context 214 by providing the guidance landmark 234 most recognizable by the user. As a result, the navigation system 100 can improve the safety of the user operating the vehicle, the navigation system 100, or a combination thereof by the user accurately comprehending the navigation guidance 232 for traversing the travel route 212.

Figure 6:
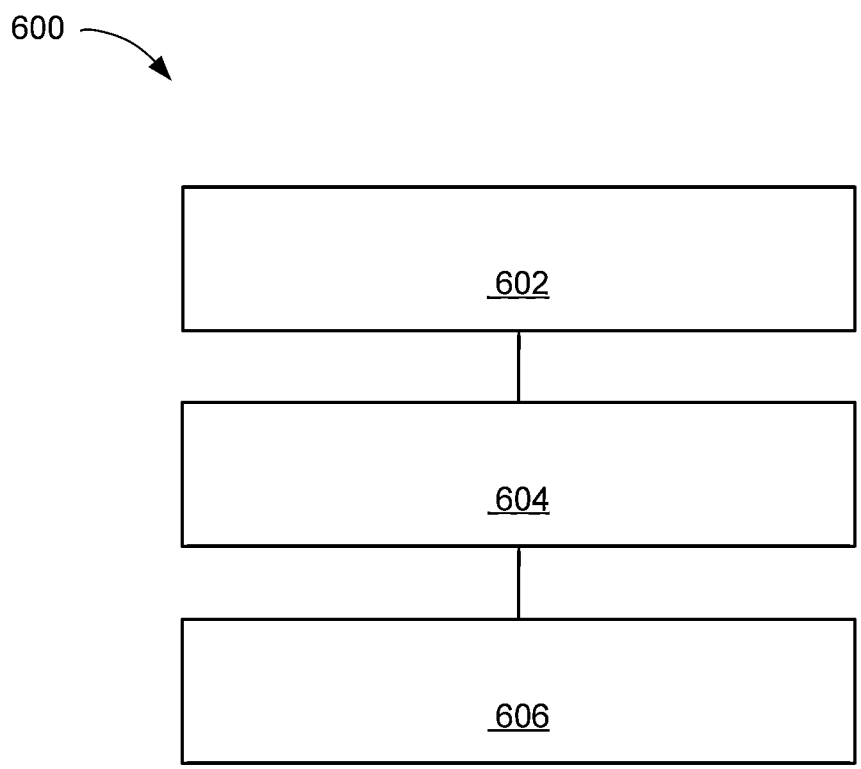
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a travel context with a control unit for traveling through a geographic region in a block 602; generating a mental model for the travel context in a block 604; and determining a guidance landmark based on the mental model for providing a navigation guidance for presenting on a device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation executed by a control unit of a navigation system comprising:
using a control unit of the navigation system for:
determining a travel context to detect a maneuver location traveling through a geographic region in real time by a location unit;
generating a mental model for the travel context, the mental model being represented by a digital model;
determining a landmark-determination zone dynamically and in real time with the control unit based on a radius from the maneuver location within which a capturing sensor detects an object;
determining a guidance landmark including at least one of a stationary landmark and a dynamic landmark based on the mental model, the landmark-determination zone, or a combination thereof for providing a navigation guidance; and
transmitting the guidance landmark for presenting on a mobile electronic device.

2. The method as claimed in claim 1 wherein generating the mental model includes generating a user knowledge model based on a user profile for determining the guidance landmark suited for a user's knowledge, a user's sensibility, or a combination thereof.

3. The method as claimed in claim 1 wherein generating the mental model includes generating a user knowledge model for determining the guidance landmark suited for a user's capability.

4. The method as claimed in claim 1 wherein generating the mental model includes generating a user knowledge model based on an analytic reference for recognizing a user's knowledge, a user's sensibility, or a combination thereof.

5. The method as claimed in claim 1 wherein generating the mental model includes generating a common knowledge model for representing a common knowledge for the geographic region.

6. The method as claimed in claim 1 wherein generating the mental model includes generating a common knowledge model for representing a cultural reference for a category of interest for the geographic region.

7. The method as claimed in claim 1 further comprising determining the landmark-determination zone based on the mental model for filtering the geographic region unsuitable for determining the guidance landmark.

8. The method as claimed in claim 1 further comprising determining the landmark-determination zone based on a user vicinity from the maneuver location.

9. The method as claimed in claim 1 wherein determining the guidance landmark includes determining the guidance landmark tailored to a user's knowledge, a user's sensibility, or a combination thereof.

10. The method as claimed in claim 1 further comprising generating a navigation guidance having the guidance landmark based on a user knowledge model overriding a common knowledge model.

11. A navigation system comprising:
a control unit for:
determining a travel context to detect a maneuver location traveling through a geographic region in real time by a location unit,
generating a mental model for the travel context, the mental model being represented by a digital model,
determining a landmark-determination zone dynamically and in real time based on a radius from the maneuver location within which a capturing sensor detects an object,
determining a guidance landmark including at least one of a stationary landmark and a dynamic landmark based on the mental model, the landmark-determination zone, or a combination thereof for providing a navigation guidance, and
a communication interface, coupled to the control unit, for transmitting the navigation guidance with the guidance landmark for presenting on a mobile electronic device.

12. The system as claimed in claim 11 wherein the control unit is for generating a user knowledge model based on a user profile for determining the guidance landmark suited for a user's knowledge, a user's sensibility, or a combination thereof.

13. The system as claimed in claim 11 wherein the control unit is for generating a user knowledge model for determining the guidance landmark suited for a user's capability.

14. The system as claimed in claim 11 wherein the control unit is for generating a user knowledge model based on an analytic reference for recognizing a user's knowledge, a user's sensibility, or a combination thereof.

15. The system as claimed in claim 11 wherein the control unit is for generating a common knowledge model for representing a common knowledge for the geographic region.

16. A non-transitory computer readable medium including instructions for execution by a control unit comprising:
determining a travel context to detect a maneuver location traveling through a geographic region in real time by a location unit;
generating a mental model for the travel context, the mental model being represented by a digital model; and
determining a landmark-determination zone dynamically and in real time based on a radius from the maneuver location within which a capturing sensor detects an object;
determining a guidance landmark including at least one of a stationary landmark and a dynamic landmark based on the mental model, the landmark-determination zone, or a combination thereof for providing a navigation guidance for presenting on a mobile electronic device.

17. The non-transitory computer readable medium as claimed in claim 16 wherein generating a user knowledge model based on a user profile for determining the guidance landmark suited for a user's knowledge, a user's sensibility, or a combination thereof.

18. The non-transitory computer readable medium as claimed in claim 16 wherein generating a user knowledge model for determining the guidance landmark suited for a user's capability.

19. The non-transitory computer readable medium as claimed in claim 16 wherein generating a user knowledge model based on an analytic reference for recognizing a user's knowledge, a user's sensibility, or a combination thereof.

20. The non-transitory computer readable medium as claimed in claim 16 wherein generating a common knowledge model for representing a common knowledge for the geographic region.

* * * * *